H. N. PARSONS.
ANTIFRICTION BEARING.
APPLICATION FILED NOV. 24, 1919.
1,411,806.
Patented Apr. 4, 1922.
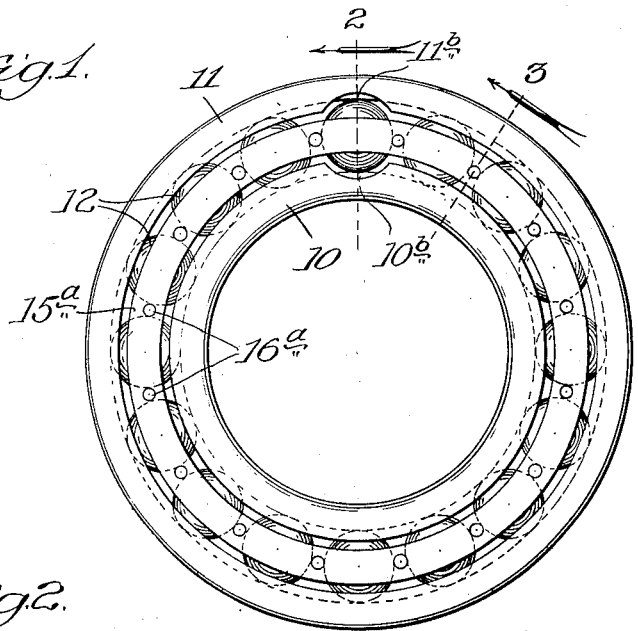
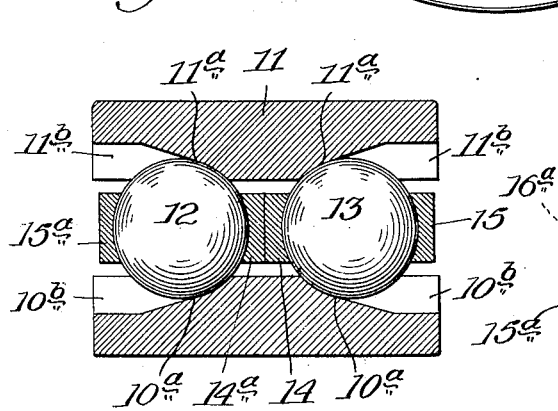
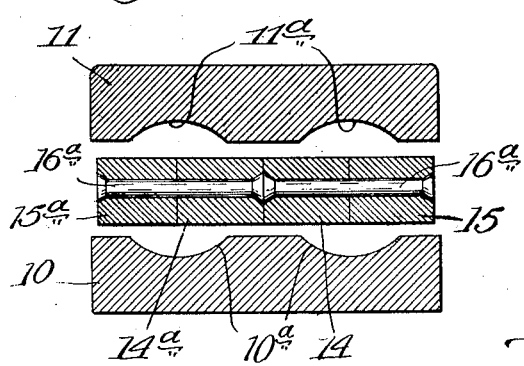
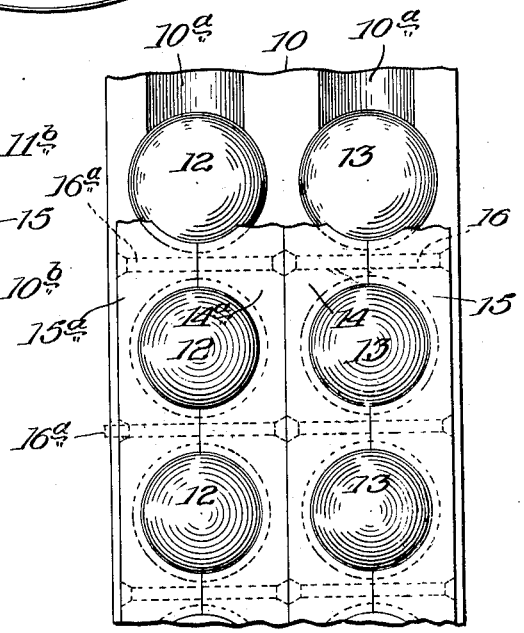
Inventor:
Harry N. Parsons,
By Dyrenforth, Lee, Chritton & Wiles,
Attys.

UNITED STATES PATENT OFFICE.

HARRY N. PARSONS, OF CHICAGO, ILLINOIS, ASSIGNOR TO U. S. BALL BEARING MANUFACTURING COMPANY, OF CHICAGO, ILLINOIS, A CORPORATION OF ILLINOIS.

ANTIFRICTION BEARING.

1,411,806.     Specification of Letters Patent.     Patented Apr. 4, 1922.

Application filed November 24, 1919. Serial No. 340,169.

*To all whom it may concern:*

Be it known that I, HARRY N. PARSONS, a citizen of the United States, residing at 2716 Sunnyside Ave., Chicago, in the county of Cook and State of Illinois, have invented a new and useful Improvement in Antifriction Bearings, of which the following is a specification.

My invention relates to anti-friction bearings and is particularly adapted for use on radial bearings having a plurality of ball sets operating in parallel planes. It is fully described in the following specification and shown in the drawings, in which—

Figure 1 is a side elevation of the two row combined radial and thrust ball bearing;

Fig. 2 is a section on the line 2 of Fig. 1;

Fig. 3 is a section on the line 3 of Fig. 1; and

Fig. 4 is a partial side elevation with the outer race member removed.

I have illustrated as an embodiment of my invention a two row combined radial and thrust ball bearing having inner and outer race members 10 and 11 having registering facing ball races $10^a$ and $11^a$ respectively between which are placed sets of balls 12 and 13. The inner and outer races are cut away to form side channels $10^b$ and $11^b$ through which the balls may be dropped one at a time. Ball separators 14 and retainers 15 are provided which have flat exterior faces and are cupped at regular intervals to receive the balls. These separated elements are secured together by means of rivets 16.

The first set of balls is inserted between these separators which are then riveted up in any desired manner. The separator $14^a$ is then inserted with the rivets $16^a$ and placed therein and protruding therefrom, and the balls 12 forming the two sets are inserted through the opening one at a time as the separator is turned. A corresponding retainer $15^a$ is then placed over the ends of the rivets $16^a$. The face of the separator 14 which engages the face of the separator $14^a$ forms a solid flat surface against which the inner end of the rivets $16^a$ may be held while the outer end is being riveted over. If desired, a rivet 16 or $16^a$ instead of passing entirely through the inner separators 14 and $14^a$ may be secured therein in any other way.

While I have shown and described but a few embodiments of my invention, it is to be understood that it is capable of many more modifications. Changes therefore in the construction and arrangement may be made which do not depart from the scope of the appended claims in which it is my intention to claim all novelty inherent in my invention as broadly as possible in view of the prior art.

I claim:

1. The method of assembling separators on double row bearings consisting of placing two independently movable separators back to back between said rows of balls, placing a retainer on the outside of one row of said balls, and securing said retainer to its separator by rivets, the other separator acting as an anvil for holding said rivets.

2. In a radial bearing, integral inner and outer race members each having a pair of raceways lying in parallel planes and each race way formed to resist thrust in both directions, a row of balls in each race way independent cages for each row of balls, said cages having sliding contact with each other, each cage comprising a separator and a retainer, rivets passing between the balls and through the cages to fasten them together whereby each separator may act as an anvil while heading the rivets in the opposite retainer.

HARRY N. PARSONS.